(12) United States Patent
Han et al.

(10) Patent No.: US 6,583,966 B2
(45) Date of Patent: Jun. 24, 2003

(54) METHOD TO MAKE A HIGH DATA RATE STITCHED WRITER FOR A GIANT MAGNETO-RESISTIVE HEAD

(75) Inventors: Cherng-Chyi Han, San Jose, CA (US); Chyu Jiuh Torng, Pleasanton, CA (US); Mao-Min Chen, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 12 days.

(21) Appl. No.: 09/956,360

(22) Filed: Sep. 20, 2001

(65) Prior Publication Data

US 2002/0015266 A1 Feb. 7, 2002

Related U.S. Application Data

(62) Division of application No. 09/431,237, filed on Nov. 1, 1999, now Pat. No. 6,306,311.

(51) Int. Cl.⁷ .......................... G11B 5/139; G11B 5/147
(52) U.S. Cl. ....................................... 360/317; 360/126
(58) Field of Search .................................. 360/317, 126; 29/603.01, 603.07, 603.03, 603.14, 216, 22

(56) References Cited

U.S. PATENT DOCUMENTS

| | | | |
|---|---|---|---|
| 5,225,951 A | 7/1993 | Kira et al. | 360/113 |
| 5,282,308 A | 2/1994 | Chen et al. | 29/603 |
| 5,774,308 A | 6/1998 | Ohtsuka et al. | 360/126 |
| 5,805,391 A | 9/1998 | Chang et al. | 360/113 |
| 5,883,762 A | 3/1999 | Calhoun et al. | 360/113 |
| 5,894,388 A | 4/1999 | Sato et al. | 360/126 |
| 5,901,431 A | 5/1999 | Santini | 29/603.14 |
| 5,904,996 A | 5/1999 | Van Der Zaag et al. | 428/692 |
| 6,118,629 A * | 9/2000 | Huai et al. | 360/126 |
| 6,188,544 B1 * | 2/2001 | Mino | 360/126 |
| 6,353,511 B1 * | 3/2002 | Shi et al. | 360/126 |

* cited by examiner

Primary Examiner—George J. Letscher
(74) Attorney, Agent, or Firm—George O. Saile; Stephen B. Ackerman

(57) ABSTRACT

A high data-rate stitched pole magnetic read/write-head combining sputtered and plated high magnetic moment materials and a method for fabricating same. The plating and stitching aspects of this fabrication allow the formation of a very narrow write-head, while the sputtering permits the use of high magnetic moment materials having high resistivity and low coercivity.

1 Claim, 3 Drawing Sheets

METHOD TO MAKE A HIGH DATA RATE STITCHED WRITER FOR A GIANT MAGNETO-RESISTIVE HEAD

This is a division of patent application Ser. No. 09/431,237, filing date Nov. 1, 1999, now U.S. Pat. No. 6,306,311 Novel Method To Make A High Data Rate Stitched Writer For A Giant Magneto-Resistive Head, assigned to the same assignee as the present invention.

BACKGROUND OF THE INVENTION

1. Field of the Invention

This invention relates to thin film magnetic head fabrication procedures in general and, more specifically, to a method that utilizes sputtered and plated high magnetic moment material in combination with a pole stitching process.

2. Description of the Related Art

Thin film magnetic read/write heads are used to decode and encode magnetically stored information on moving magnetic media such as tapes and discs. Typically, the reading portion of the head, as presently constructed, is a small sensor, utilizing giant magneto-resistive structures (GMR), that converts rapid magnetic field fluctuations into resistance variations and thence into voltage variations. The write portion of the head consists of two pole pieces separated by a narrow gap and yoked together to form an approximately horseshoe-shaped assembly. A conductive coil is patterned between the pole pieces which, when electrically energized, induces a magnetic field between the poles which fringes across the gap. It is this induced field that encodes small magnetic regions in the moving medium.

The rapid changes in the state of the art have necessitated continual improvements in the area density of information that can be magnetically encoded and decoded in the moving medium. For a disk, this area density is a product of the number of recording tracks per mm measured radially, and the number of flux reversals per mm along the track, measured tangentially. With the development of the extremely sensitive magneto-resistive read heads, methods for improving the area density are now focussing on extending the limits of the inductive writing technology.

There are several approaches to improving the writing technology, each of which has shortcomings to be overcome. Clearly, one way to improve area density is to narrow track widths and thereby increase the number of tracks per mm. This approach requires that the writing tip of the magnetic pole assembly be made as narrow as possible and/or that the lateral fringe fields extending from the pole face be eliminated or reduced. Ohtsuka et al (U.S. Pat. No. 5,774,308) teach a method for designing a thin film inductive head that suppresses the spread of the writing magnetic field at the air bearing surface (ABS) of the pole face. While the lateral width of the pole face determines the effective track density, the vertical width of the write gap determines the linear density along the track. Chen et al (U.S. Pat. No. 5,282,308) find that small pole faces and narrow gaps can be more efficiently fabricated if the upper pole piece and yoke assembly are formed as separate parts and then "stitched" together at a pedestal structure. This stitching mechanism will play a role in the invention set forth herein. Chang et al (U.S. Pat. No. 5,805,391) teach a method of forming a stitched pole wherein the pole tip is placed close to the flared yoke so as to optimize the magnetic field from the ABS portion of the pole tip. Santoni (U.S. Pat. No. 5,901,431) teaches a method for forming a narrow pole piece and narrow gap without stitching, but by using a single photolithographic and plating process.

There are other problems associated with the necessity of inducing strong, rapidly varying magnetic fields in the pole structure. One problem has to do with the creation of undesireable eddy currents within the pole pieces. Another problem is the requirement of using magnetic materials that can both sustain high magnetic fields and have them change rapidly. The eddy current problem can be resolved by using magnetic materials with high resistivity. The magnetic moment problem can be resolved by using magnetic materials with high magnetic moments and low coercivity. A wider range of such materials becomes available if they can be deposited by sputtering rather than the more commonly used method of electroplating. Sato et al (U.S. Pat. No. 5,894,388) teach a method of forming magnetic pole structures out of such soft magnetic materials by sputtering them on a core of non-magnetic material. Van der Zaag et al (U.S. Pat. No. 5,904,996) teach a method of manufacturing a magnetic field sensor by a Ne—He sputtering technique. However, electroplating techniques are not completely ruled out, according to a method taught by Calhoun et al (U.S. Pat. No. 5,883,762). Sputtered films have as a shortcoming, the fact that they often contain residual internal stresses. Kira et al (U.S. Pat. No. 5,225,951) teach a sputtered yoke process that incorporates a method for compensating internal stresses and, thereby, preventing the degradation of magnetic properties.

The present invention differs from all those cited above in that it combines the fabrication advantages of the stitched pole process with the material advantages of high magnetic moment magnetic materials.

SUMMARY OF THE INVENTION

A first object of this invention is to fabricate a narrow read/write head that is capable of encoding magnetic data at rates exceeding 500 Mb/s.

A second object of this invention is to fabricate a narrow write head using sputtered magnetic materials having higher resistivity and magnetic moments than plated materials.

A third object of this invention is to provide an integrated fabrication process that combines the high magnetic moment (HMM) virtues of a sputtered magnetic material with the patterning properties of plated magnetic materials.

A fourth object of this invention is to provide such a pole structure having sufficient thickness and resistivity properties to overcome the problem of eddy currents.

These objects will be achieved through the use of a stitched writer process that allows the formation of a narrow head, in conjunction with the sequential deposition of sputtered and plated high magnetic moment materials, which allow high data-rate encoding of magnetic information, over a planarized giant magneto-resistive (GMR) structure.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENTS

The present invention is a high data-rate stitched pole magnetic read/write-head, incorporating a novel combination of sputtered and plated high resistivity, high magnetic moment materials. It is also a method for fabricating said read/write-head.

A description of the preferred embodiment will be given in the context of the schematic drawings designated as FIG. 1 through FIG. 7.

Figure 1:
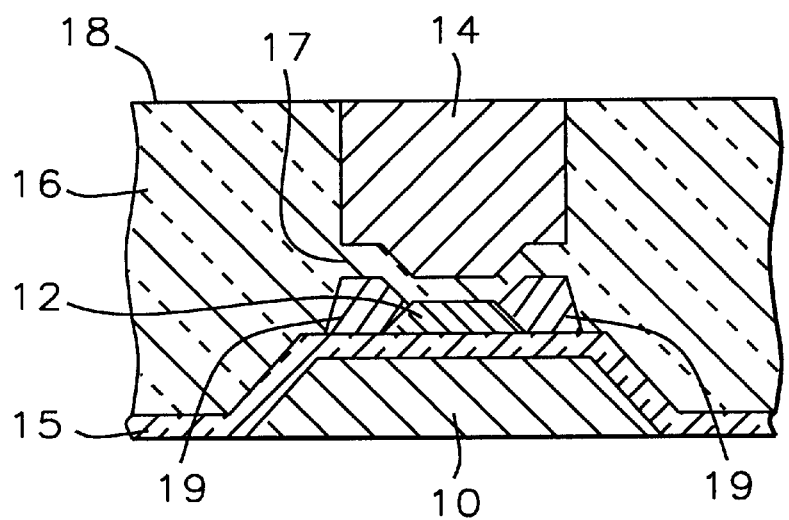
FIG. 1 shows a schematic air bearing surface (ABS) view of a planarized read-head structure on which will be fabricated the write head structure of the present invention, using the method of the present invention.

Referring first to FIG. 1, we have as a starting point for the fabrication of the present invention a planarized, giant magneto-resistive (GMR) read-head, comprising a lower magnetic shield (10), a first gap (15), the GMR field sensor (12), side pieces providing lead/longitudinal bias (19), a second gap (17), an upper magnetic shield (14) of material such as NiFe, CoZnTa, CoZnNb, FeAlSi, FeAlN or FeTaN, which also serves as the lower pole piece of the write-head to be fabricated and a dielectric or non-magnetic metal medium (16). The upper surfaces (18) of the dielectric or non-magnetic metal medium (16) and the upper magnetic shield (14) have been planarized by a method of chemical-mechanical polishing (CMP).

Figure 2:
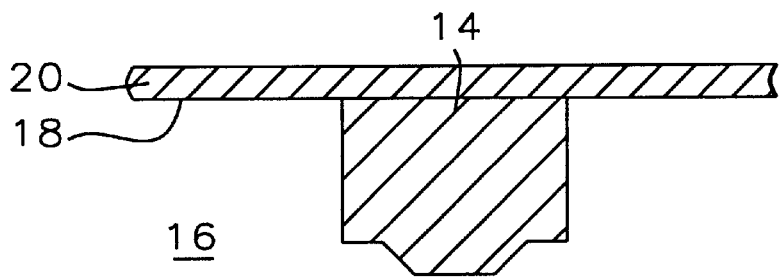
FIG. 2 shows the formation of a first sputtered magnetic layer on the planarized upper shield and dielectric surfaces of the structure in FIG. 1. The planarized upper shield and dielectric are shown, but the lower shield and read head are omitted for clarity.

FIG. 2 now shows the deposition of a first sputtered layer of high magnetic moment (HMM) magnetic material (20) on the planarized surface (18). This high magnetic moment material could be one of a group of materials such as FeN, FeAlN, FeTaN, CoFe or CoNiFe and would be deposited with a thickness of between approximately 500 angstroms and 1.5 microns. The upper shield (14) is shown here, but all other components of the read-head have been omitted for clarity.

Figure 3:
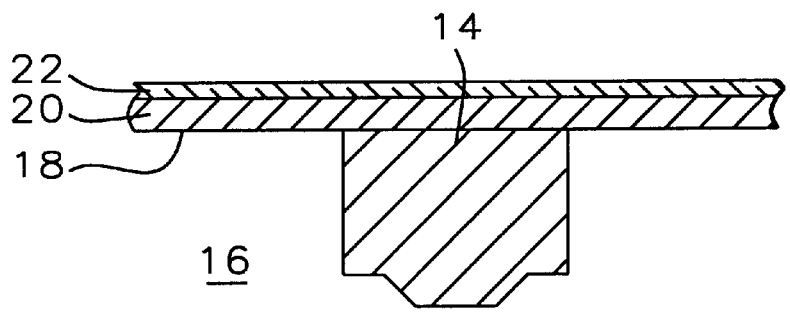
FIG. 3 shows the formation of a narrow write-gap layer over the first sputtered layer.

FIG. 3 shows the deposition of a write-gap layer (22) on the first sputtered layer (20). The write gap layer material could be a material such as $Al_2O_3$, $SiO_2$, or a nonmagnetic metal, deposited by sputtering to a thickness of between 1000 angstroms and 5000 angstroms.

Figure 4:
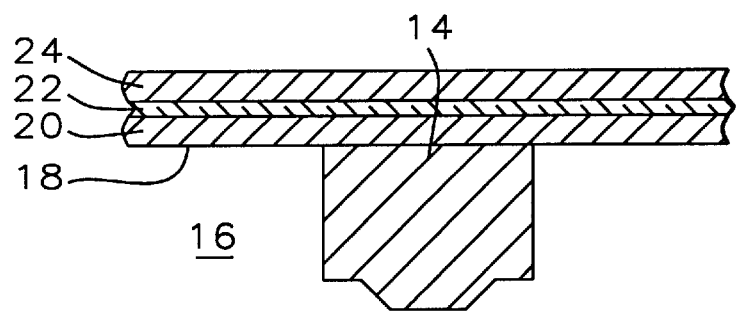
FIG. 4 shows a second sputtered magnetic layer deposited over the write-gap layer. This process will occur after the gap layer has been has been patterned and conducting vias have been established.

FIG. 4 shows the deposition of a second sputtered layer of high magnetic moment (HMM) magnetic material (24), which may be of the same composition and thickness of the first sputtered layer (20). Said layer is then covered by a layer of photoresist and patterned. Subsequent to the stripping of this photoresist, the fabrication is ready for the next process, which is indicated in FIG. 5.

Figure 5:
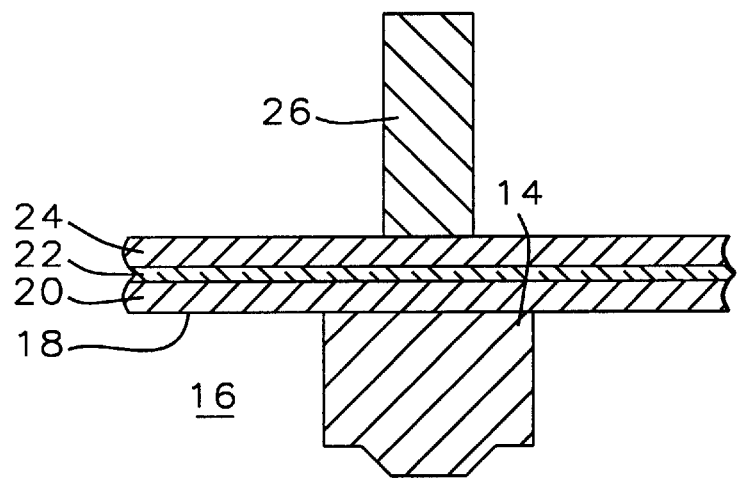
FIG. 5 shows the formation of a plated high magnetic moment (HMM) portion of the pole structure. This portion is fabricated after a patterning process needed to establish the final stitching of the pole pieces.

FIG. 5 shows the deposition of a plated pole piece (26) on the second sputtered and patterned HMM magnetic layer (24) after the stripping of the photoresist. This pole piece can be formed of a HMM material such as NiFe, CoFe, CoFeV or CoNiFe and can have a thickness of between 1.5 microns and 6 microns. This pole piece will ultimately serve as part of the stitched writer top pole and also as a trim mask for the fabrication now consisting of layers (24), (22), (20) and (14). It will itself be trimmed to a thickness adequate for magnetic writing, providing sufficient flux and producing no corner writing or erasing.

Figure 6:
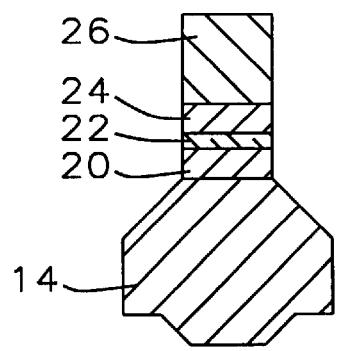
FIG. 6 is an isolated view of the air bearing surface of the write-head structure after trimming the lower shield, the sputtered layers, the gap layer and the plated pole piece. The plated pole piece has also served as a trimming mask for this process. The remaining thickness of the plated pole piece also provides the necessary skin depth to overcome the eddy current problem.

FIG. 6 shows an isolated view of the air bearing surface (ABS) of the write structure after trimming and shaping, but prior to the final pole stitching process. The structure now comprises a lower pole piece and shield (14), a write (22) gap between two sputtered magnetic layers (20)&(24) and the upper plated pole piece (26).

Figure 7:
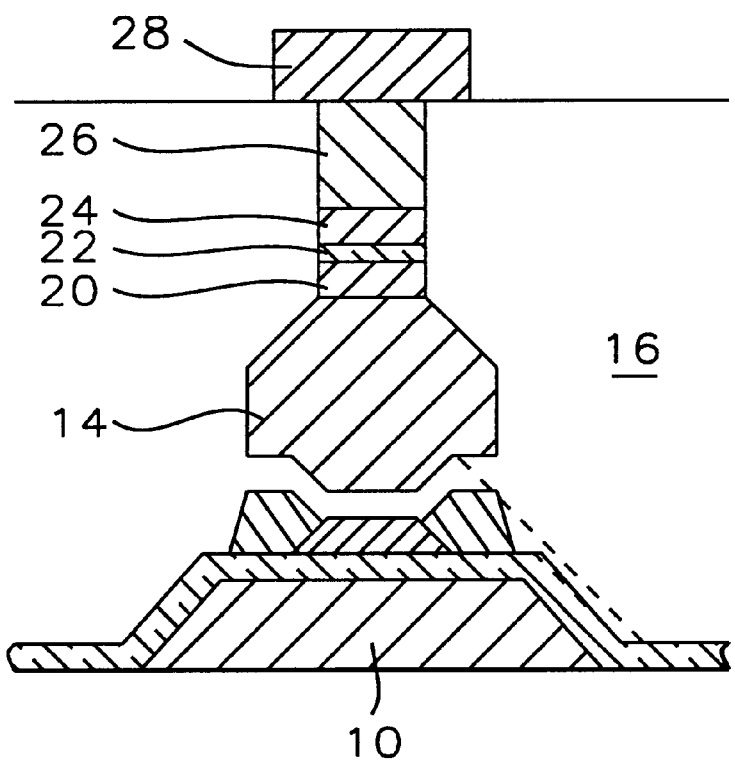
FIG. 7 shows the completed structure after the stitching of the final pole piece.

FIG. 7 shows the completed read/write-head fabrication, with the remaining piece of the upper pole (28), which can consist of either plated or sputtered magnetic material such as CoFe, CoNiFe, CoFeV or NiFe, now stitched on.

As is understood by a person skilled in the art, the preferred embodiment and examples of the present invention are illustrative of the present invention rather than limiting of it. Revisions and modifications may be made to processes, structures and dimensions through which is is implemented the novel method to make a high data rate stitched writer for a giant magnetoresistive head in accord with the preferred embodiment and examples of the present invention while still providing such high data rate stitched writer for a giant magnetoresistive head by said novel method in accord with the present invention and appended claims.

What is claimed is:

1. A high data-rate stitched-pole magnetic read/write-head combining sputtered and plated high magnetic moment (HMM) materials, comprising:

a planarized GMR read-head positioned between a lower magnetic shield and an upper magnetic shield;

a three-layer structure formed on the upper magnetic shield of the read-head, comprising a first sputtered HMM material layer, over which is a patterned write-gap layer and over which is a second sputtered HMM material layer which is patterned and wherein said sputtered HMM material layers are formed of the HMM material FeAlN, CoFeV, CoFe or CoNiFe deposited to a thickness of between 500 angstroms and 1.5 microns;

a plated pole piece consisting of HMM material formed on the patterned second sputtered HMM material layer of the three layer structure and trimmed to its dimensions;

a final pole piece stitched to the structure.

* * * * *